United States Patent [19]

Vallauri et al.

[11] Patent Number: 4,961,255
[45] Date of Patent: Oct. 9, 1990

[54] APPARATUS FOR APPLYING AN INSULATING SLEEVE TO AN ELECTRIC CABLE JOINT

[75] Inventors: Ubaldo Vallauri, Monza; Francesco Portas, Quattordio, both of Italy

[73] Assignee: Societa' Cavi Pirelli S.p.A., Milan, Italy

[21] Appl. No.: 433,979

[22] Filed: Nov. 8, 1989

[30] Foreign Application Priority Data

Nov. 10, 1988 [IT] Italy ................................ 22578 A/88

[51] Int. Cl.⁵ .................................................. B32B 1/08
[52] U.S. Cl. ...................................................... 29/235
[58] Field of Search ..................... 29/235, 450; 156/99; 174/84 R; 428/36

[56] References Cited

U.S. PATENT DOCUMENTS

| | | |
|---|---|---|
| 4,654,241 | 3/1987 | Vallauri et al. ................... 29/235 |
| 4,757,588 | 7/1988 | Churchich ......................... 29/235 |
| 4,815,187 | 3/1989 | Rettig et al. ...................... 29/235 |

Primary Examiner—Robert C. Watson
Attorney, Agent, or Firm—Brooks Haidt Haffner & Delahunty

[57] ABSTRACT

Apparatus for applying an elastic sleeve to a joint between a pair of electric cables including a tubular cylindrical plastic support with an internal bore larger than the diameters of the cables and on which the elastic sleeve in its stretched state is mounted. A pair of openable mobile elements surround the support, and the element farther from an end of the sleeve is releasably secured to the support, such as by pins extending from the element through openings in the support and engageable with the outer surface of one of the cables. The other element is slidable on the support and can be moved toward the end of the sleeve. A screw mechanism acting between the elements moves them away from each other causing the support to be pulled out of the sleeve. With the apparatus positioned with the support and sleeve around the joint, the removal of the support permits the sleeve to contract around the joint.

17 Claims, 2 Drawing Sheets

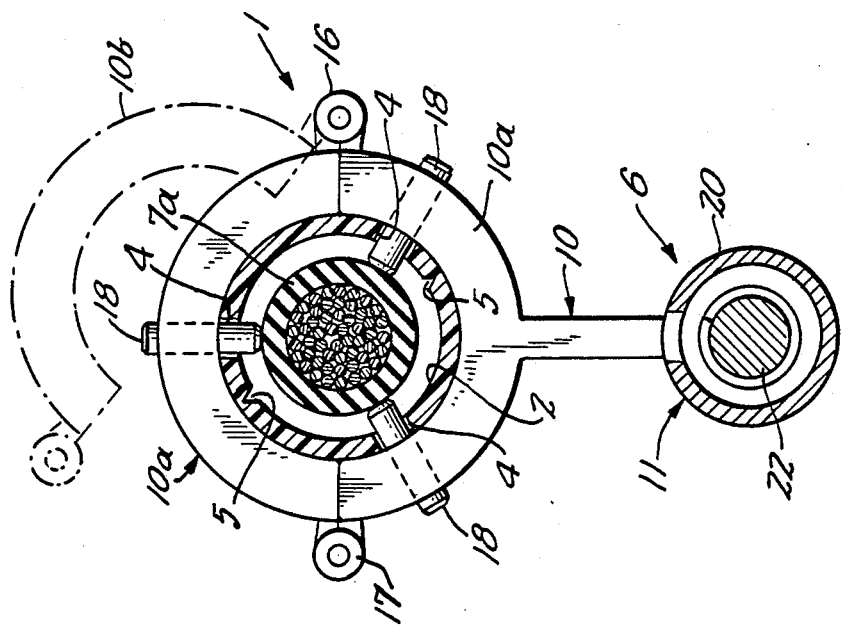
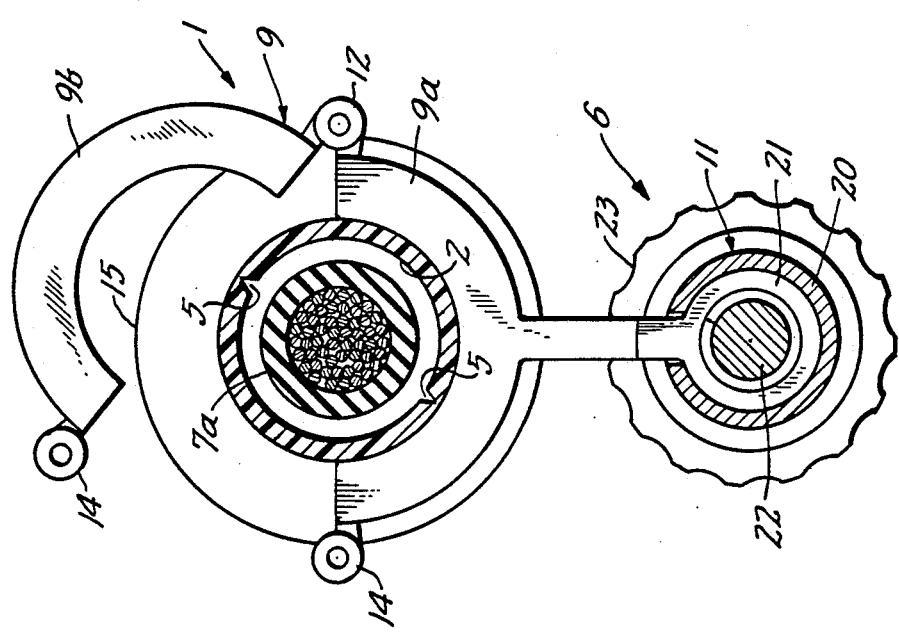

APPARATUS FOR APPLYING AN INSULATING SLEEVE TO AN ELECTRIC CABLE JOINT

BACKGROUND OF THE INVENTION

The present invention relates to apparatus for applying insulating sleeves to an electrical and mechanical joint between ends of electric cables and of the type in which a cylindrical tubular support around which an elastically expanded sleeve of elastomeric material is disposed, said tubular support being provided with an inner cavity having a diameter greater than the outer diameter of the cables to be joined and removing means acting on the sleeve and on the tubular support to remove this latter from the sleeve itself after said support and said sleeve have been positioned at the joining zone of the cables.

As is known, when two electric cables are joined together at their respective ends, it is necessary to apply, in the joining zone, a sleeve which has the double function of providing an adequate electrical insulation in said zones and of protecting the joining from the various outside agents, such as moisture, dust, etc.

A type of sleeve widely used in the field is substantially made of elastomeric material with such dimensions that when applied on the joint, the sleeve itself exerts a sufficient radial pressure on the outer surfaces of the insulations of the cables. This condition is necessary in order to assure the lack of air bubbles at the interface between the sleeve and the surface of the insulations of the cables, the presence of which seriously impair the capability of the sleeve under operating conditions.

During the manufacture of the sleeves, they are previously fitted, while elastically expanded, around appropriate cylindrical tubular supports of a rigid material, such as, for example, polymeric materials, which can be easily applied on the joints of the cables. During application, the tubular support, which has an inner diameter greater than the diameter of the cables, is fitted around one of the cables before the cables are joined. Following the mutual interconnection of the conductors of the cables, the tubular support together with the sleeve fitted therearound, is symmetrically arranged on the joining zone and the support is then removed from the sleeve. Therefore, the sleeve shrinks elastically around the joint and perfectly matches the surfaces of the insulations of the cables in the joining zone.

The release of the tubular support from the sleeve is effected through removing means which, at the present state of the art, is essentially constituted by a plurality of annular flanges consecutively connected by threaded rods engaging, during application, through the flanges themselves by way of respective interposed bushings. The flanges are coaxially aligned along a portion of the tubular support which projects outside the sleeve. More specifically, one of said flanges abuts on an outer shoulder provided outside the sleeve, while another flange acts on an annular projection provided on one end of the tubular support. In this way, acting on the bushings that connect each flange to the threaded rods, the flanges move away from each other and consequently the tubular support is removed from the insulating sleeve.

One of the more relevant drawbacks of the known technique consists in the risk of causing tears or cuts at the outer surfaces of the insulations of the cables during the removal of the tubular support from the sleeve. In fact, the insulations of the cables do not have a high mechanical rigidity and are subject to the risk of bending, e.g., under the effect of their own weight, during the joining operation and the application of the sleeve. Therefore, it may easily happen that when the tubular support is removed from the sleeve as previously described, the edges of the ends of the support slide with force on the outer surface of the insulations of the cables thereby damaging the insulations.

Other drawbacks arise when, after the application of the sleeve, the tubular support has to be cut longitudinally in order to remove it from the cables. The operations for cutting the support are in fact quite difficult, especially when the cables are placed in narrow spaces, and consequently, it may happen that the cables are inadvertently damaged with the cutting tools used.

Also, the flanges provided in the removing means must be cut so as to be removed from the cables. This need gives rise to complications which are to be added to those previously described and, moreover, produces an economic loss since the flanges, after the cutting operation, obviously cannot be utilized again.

The main object of the present invention is substantially that of overcoming the drawbacks of the known techniques by providing apparatus able to eliminate any possible risk that the ends of the tubular support will interfere with the outer surface of the insulations of the cables during the removal of the support itself from the sleeve and which makes the operations for obtaining the release of the removing means and the tubular support from the cables relatively simple.

SUMMARY OF THE INVENTION

Such object, and other objects, will be apparent from the present description and are substantially achieved by means of apparatus for applying sleeves to electric cable joints which is characterized by the fact that said removing means comprises a first mobile element arranged to abut a shoulder of the sleeve; a second mobile element having at least two connecting pins circumferentially distributed around the axis of the tubular support and arranged to engage releasably, in corresponding through holes provided in proximity to one end of said support, said connecting pins being arranged to engage the outer surface of one of said cables so as to dispose it coaxially with the tubular support; and a driving unit acting on said mobile elements to move one away from the other so as to remove the tubular support from the sleeve.

BRIEF DESCRIPTION OF THE DRAWINGS

FIG. 2 is a cross-section of the embodiment shown in FIG. 1 and is taken along the line II—II indicated in FIG. 1; and FIG. 3 is a cross-section of the embodiment shown in FIG. 1 and is taken along line III—III indicated in FIG. 1.

DESCRIPTION OF PREFERRED EMBODIMENTS

Figure 1:
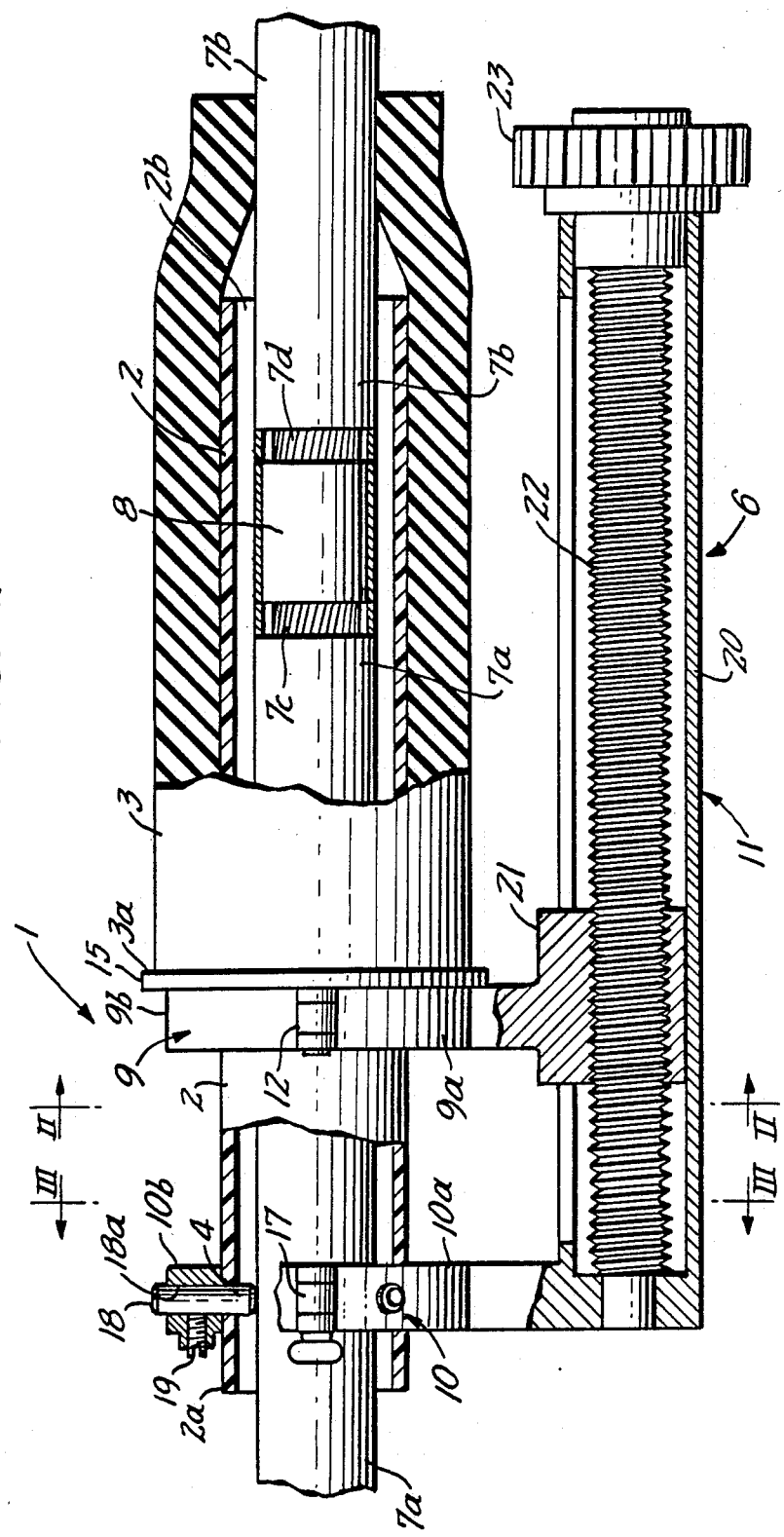
FIG. 1 is a side elevation view, partly in section, of the apparatus according to the invention as it appears when the tubular support is being removed from the sleeve to apply this latter on the joining zone of two electric cables.

With reference to the drawings, reference numeral 1 designates the whole apparatus or device for applying sleeves to electric cable joints according to the present invention.

The apparatus or device 1 comprises a rigid cylindrical tubular support 2, for example, made of polymeric material, around which a conventional sleeve 3 of elastomeric material has been fitted in its radially, elastically expanded condition. The forced application of the sleeve 3 on the tubular support 2 is made in a known and conventional manner during its manufacture and consequently, it is not necessary to describe such process herein.

As shown in the drawings (FIGS. 1 and 3), at least two through holes 4 are provided at a first end 2a of the tubular support 2, the function of said hole 4 being described hereinafter. In the example illustrated, there are three through holes 4, distributed at 120° from each other around the axis of the support 2.

According to the present invention, at least one breaking notch 5 or line of weakening (see FIGS. 2 and 3) is provided inside the tubular support, said notch 5 extending axially from the first end 2a to a second end 2b of the tubular support 2. The illustrated example includes inwardly opening notches 5 arranged in diametrically opposite positions, extending longitudinally inside the support 2 and having a wedge-shaped section.

The device 1 also comprises removing means 6 arranged to act on the sleeve 3 and on the tubular support 2 to remove this latter from inside the sleeve 3 when the sleeve 3 itself is to be applied on two cables 7a, 7b having their conductors 7c and 7d serially connected by a sleeve 8.

The removing means 6 comprise a first mobile element 9 arranged to abut a shoulder 3a of the sleeve 3, a second mobile element 10 arranged to releasably engage the tubular support 2 and a driving unit 11 acting on the mobile elements 9 and 10 to move one away from the other so as to remove the tubular support 2 from the sleeve 3.

Preferably, as shown in FIG. 2, the first mobile element 9 comprises essentially a portion 9a of a semi-circular configuration connected to the driving unit 11. At one end of the portion 9a, a pivotable portion 9b, having a semi-circular configuration, complementary to the portion 9a, is pivotally connected by a first hinge 12. The pivotable portion 9b is able to translate around its pivoting point from an open position in which it is separated from the portion 9a to a closed position in which one of its ends, opposite from the hinge 12, engages with the end of the portion 9a so as to define with this latter a closed circular configuration. In the closed position, the pivotable portion 9b is rigidly secured to the portion 9a by a bolt closing element 14 acting at the side opposite to the hinge 12.

It is preferred that the driving force of the first mobile element 9 on the sleeve 3 take place through an interposed, annular, intermediate element 15 made of semi-rigid material, i.e., deformable under the applied forces and disposed coaxially on the tubular support 2.

Similar to what has been stated with reference to the first mobile element 9, preferably, the second mobile element 10 comprises, as shown in FIG. 3, a portion 10a connected to the driving unit 11 and a pivotable portion 10b pivotally connected to the portion 10a through a second hinge 16. As shown in FIG. 3, the pivotable portion 10b is able to translate from an open position in which it is separated from the portion 10a to a closed position in which one of its ends, opposite to the hinge 16, engages with a corresponding end of the fixed portion 10a so as to form, with this latter, a substantially circular configuration within which the tubular support 2 is coaxially enclosed. Also in this case, in the closed condition, the pivotable portion 10b is rigidly secured to the portion 10a by a second bolt fastening element 17.

The engagement of the tubular support 2 by the second mobile element 10 occurs by the action of at least two connecting pins 18 borne by the mobile element 10 itself, the pins 18 being evenly distributed around the axis of the tubular support 2 and arranged so as to engage the walls of the said through holes 4. In the illustrated example, there are three connecting pins 18 disposed 120° from each other around the axis of the tubular support 2.

It is apparent from FIG. 3 that each one of the connecting pins 18 projects inside the tubular support 2 so as to abut the outer surface of one of the cables 7a or 7b, and in the specific case illustrated, the first cable 7a. In this way, the cable is maintained in a position inside and coaxial with the tubular support 2 at least in the zones near the first end 2a of the tubular support 2. It is preferred that the connecting pins 18 are made or covered with a non-abrasive material. Alternatively, it is possible to apply sliding blocks of non-abrasive material on the ends of the connecting pins 18, or to apply rollers or the like to the ends of the pins 18 which engage the outer surface of the cable.

Since the diametral dimensions of the cables 7a, 7b may vary, within certain limits and depending on the needs, each one of the connecting pins 18 can be positioned in the radial direction with respect to the axis of the tubular support 2. To this end, in the illustrated example, each connecting pin 18 is slidably received in a hole 18a provided on the second mobile element 10 and can be fastened in the desired position by means of a threaded screw 19 engaging threads in the mobile element. Obviously, other and different systems for adjusting the position of the connecting pins 18 can be adopted.

In the alternative, the connecting pins 18 can be integral with the second mobile element 10, and in this case, the tubular support 2 is provided with a plurality of holes 4 aligned along the generatrices of the tubular body itself. In this way, depending on the relationship between the outer diametral dimensions of the cables and the inner diametral dimensions of the tubular support 2, it is possible to choose in which holes 4 the pins 18 are to be inserted in order to avoid the risk that the end 2a of the support 2 can slide on the outer surface of the cable insulation.

As shown in FIG. 1, the driving unit 11 comprises a supporting tubular element 20 at one end of which the second mobile element 10 is secured. An internally threaded collar 21 has its outer surface in sliding engagement with the inside of the supporting element 20. Said collar 21 is rigidly connected to the first mobile element 9, and during operation is engaged with a threaded rod 22 rotatably connected to the supporting element 20 and rotatable by a driving hand knob 23 at the end of the supporting element 20.

The operation of the device forming the object of the present invention is easy to carry out.

The tubular support 2, the inner bore of which has a diameter greater than the diameter of the cables 7a, 7b, is suitable for being applied, together with the sleeve 3 fitted therearound, over one of the cables before the cables are connected. After so applied, the connection 8 is carried out in a way known per se and, therefore, need not be described in detail. The tubular support 2 and sleeve 3 assembly is then moved along the cables 7a, 7b so as to be disposed substantially symmetrically with respect to the connection 8 itself.

At this point, it is necessary to use the removing means 6 to remove the tubular support 2 from the sleeve 3 so that the sleeve 3, shrinking elastically, uniformly engages the surfaces of the insulations of the cables 7a and 7b in proximity to the connection 8. To this end, the portions 9a, 10a of the mobile elements 9 and 10 are engaged with the tubular support 2, at the zones near its first end 2a, with the pivotable portions 9b, 10b in an open position. In this situation, the connecting pins 18 borne by the portion 10b of the second mobile element 10 are engaged in the corresponding holes 4 in the tubular support 2. Then, the pivotable portions 9b, 10b are placed in their closed positions so that both the mobile elements 9 and 10 completely surround the tubular support 2. By this operation, the connecting pins 18 borne by the portion 10b engage the walls of the corresponding through holes 4.

The connecting pins 18, after possible adjustments of their radial positions, act on the cable 7a so that this latter, at least in proximity of the end 2a of the tubular support 2, is positioned coaxially with respect to the tubular support 2 itself.

Subsequently, the hand knob 23 is rotated manually so that with rotation of the threaded rod 22, the mobile elements 9 and 10 move away from each other.

With such movement of the elements 9 and 10, the tubular support 2, connected to the second mobile element 10, is removed from the sleeve 3, the first mobile element 9 restraining movement of the sleeve 3 through the intermediate element 15.

As soon as a short length of the sleeve 3 projects beyond the second end 2b of the tubular support 2, said sleeve length will begin to elastically shrink and engage the insulation surface of the cable 7b. The arrangement of the sleeve 3 with respect to the connection 8 will remain fixed during the whole operation for the removal of the tubular support 2 because only the support 2 itself is moved.

When said removing operation has been completed, the mobile elements 9, 10 are released from the tubular support 2 and consequently, from the cables 7a, 7b by opening the pivotable portions 9b, 10b.

Advantageously, due to the presence of the breaking notches 5, the tubular support 2 can be easily cut and removed from the cables 7a, 7b without any risk of damaging the cables themselves. If desired, the annular element 15 may be left surrounding the cable 7a, but preferably, it is cut radially and removed.

The present invention thus achieves the stated objects.

In fact, the device forming the object of the present invention is able to avoid any possible risk of the tubular support end engaging the surfaces of the insulations of the cables during the removal of the support 2 from the sleeve 3. In this way, any possible risk of damaging the insulations of the cables is eliminated.

Moreover, the operation of the device of the present invention for obtaining the release of the tubular support 2 from the cables, when the application of the sleeve 3 has been completed is simple.

In addition, it is to be stressed that it is not necessary to carry out any cutting operation or the like to release the removing means itself from the cables. Besides representing a considerable saving of time and a further reduction in the risks of damaging the cables, such lack of cutting is economically advantageous since, unlike the known technique, the removing means can be used again for other operations for applying sleeves to other cable joints.

Although preferred embodiments of the present invention have been described and illustrated, it will be apparent to those skilled in the art that various modifications may be made without departing from the principles of the invention.

The embodiments of the invention in which an exclusive property or privilege is claimed are defined as follows:

1. Apparatus for applying an elastic sleeve around a joint between a pair of electric cables of predetermined outer diameters, said apparatus comprising:

a cylindrical tubular support for receiving on its outer surface a sleeve of elastomeric material in its elastically expanded condition, said tubular support having an inner bore of a diameter greater than the outer diameters of the cables to be joined; and removing means for engaging the sleeve and the tubular support for removing the support from within the sleeve after said support and said sleeve have been positioned around the joint zone of the cables, said removing means comprising:

a first mobile element encircling said support for applying an axially directed force to an end of the sleeve;

a second mobile element encircling said support adjacent said first mobile element and having means engaging said tubular support and disposed to engage the outer surface of the insulation of one of said cables for maintaining said support substantially coaxial to the outer surface of the insulation of the cable; and a driving unit acting between said first mobile element and said second mobile element, for moving one said mobile element away from the other thereof and thereby remove said tubular support from within the sleeve.

2. Apparatus as set forth in claim 1 wherein said support has at least one line of weakening extending in the direction of the axis of said support for facilitating breaking of said support after it is removed from within the sleeve.

3. Apparatus as set forth in claim 2 wherein said line of weakening extends from one end of said support to the opposite end thereof.

4. Apparatus as set forth in claim 3 wherein said line of weakening is a notch opening at the internal surface of said support.

5. Apparatus as set forth in claim 3 wherein there are two lines of weakening disposed at diametrically opposite positions on said support.

6. Apparatus as set forth in claim 1 wherein said support has at least two radially extending and circumferentially spaced through-holes at one end thereof and wherein said means for engaging said support and the outer surface of the insulation of the cable comprises connecting pins secured to said second mobile element and extending radially through said through-holes.

7. Apparatus as set forth in claim 6 wherein said connecting pins are secured to said second mobile element in radially adjustable relation to said second mobile element.

8. Apparatus as set forth in claim 1 further comprising a semi-rigid annular element adjacent said first mobile element for engaging said end of the sleeve, said annular element being intermediate said first mobile element and said end of the sleeve.

9. Apparatus as set forth in claim 1 wherein said second mobile element comprises two portions which together encircle said support, one of said portions being connected to said driving unit for movement thereby and the other of said portions being pivotally connected to said one portion whereby said other portion may be pivoted from a closed position in which it engages said support to an open position in which the cable can be inserted between said two portions.

10. Apparatus as set forth in claim 9 further comprising locking means for locking said other portion in its closed position.

11. Apparatus as set forth in claim 1 wherein said first mobile element comprises two portions which together encircle said support, one of said portions being connected to said driving unit for movement thereby and the other of said portions being pivotally connected to said one portion whereby said other portion may be pivoted from a closed position in which it engages said support to an open position in which the cable can be inserted between said two portions.

12. Apparatus as set forth in claim 11 further comprising locking means for locking said other portion in its closed position.

13. Apparatus as set forth in claim 1 wherein said driving unit comprises a tube secured to said second mobile element, a threaded rotatable rod internally of said tube and a threaded collar mounted on said rod and secured to first mobile element, said collar being slidable axially of said tube and rotation of said rod causing movement of said collar and hence, relative movement of said first mobile element and said second mobile element in the direction axially of said support.

14. Apparatus as set forth in claim 13 wherein said tube has a slot in the wall thereof through which said collar extends.

15. Apparatus for applying an elastic sleeve around a joint between a pair of electric cables of predetermined outer diameters, said apparatus comprising:
   a cylindrical tubular support for receiving thereon an elastically stretched sleeve, said support having a bore of a diameter greater than the diameters of the cables and having at least one line of weakening extending in the direction of the axis of said support for facilitating breaking of said support after it is removed from within the sleeve;
   a pair of mobile elements, one of said elements engaging said support and the other of said elements being engageable with an end of said sleeve, said elements being movable relative to each other in the direction of the axis of said support; and
   driving means connected to said elements for moving said elements away from each other and causing axial movement of said support relative to said other of said mobile elements.

16. Apparatus as set forth in claim 15 wherein said line of weakening extends from one end of said support to the opposite end thereof.

17. Apparatus as set forth in claim 15 wherein there are two lines of weakening disposed at diametrically opposite positions on said support.

* * * * *